United States Patent [19]

Schroeder et al.

[11] Patent Number: 5,092,819
[45] Date of Patent: Mar. 3, 1992

[54] METHOD AND APPARATUS FOR QUALITATIVELY MEASURING CHARACTERISTICS OF GRAIN TO BE HARVESTED

[76] Inventors: Michael J. Schroeder, Rte. 1, Box 116, Derby, Iowa 50068; Charles C. Shivvers, 303 N. Lincoln, Corydon, Iowa 50060; Steven D. Shivvers, Rte. 2, Box 10, Allerton, Iowa 50008; Carl C. Shivvers, 809 Park St., Chariton, Iowa 50049; Ronald L. McCaslen, Box 224, Millerton, Iowa 50165; Robert D. Engle, Rte. 2, Box 40, Corydon, Iowa 50060

[21] Appl. No.: 525,198
[22] Filed: May 17, 1990
[51] Int. Cl.$^5$ ............................................. A01F 12/00
[52] U.S. Cl. ......................................... 460/7; 56/10.2; 56/DIG. 15
[58] Field of Search ................ 460/7, 118; 56/10.2, 56/DIG. 15, DIG. 23; 34/56; 73/73; 324/664, 694; 364/400

[56] References Cited

U.S. PATENT DOCUMENTS

| | | | |
|---|---|---|---|
| 3,760,267 | 9/1973 | Williams | 324/61 |
| 3,946,496 | 3/1976 | Sukup | 214/17 |
| 4,152,840 | 5/1979 | Stille | 214/17 |
| 4,168,466 | 9/1979 | Boldt | 324/61 |
| 4,337,611 | 7/1982 | Mailander et al. | 56/10.2 |
| 4,376,298 | 3/1983 | Sokol et al. | 364/551 |
| 4,399,404 | 8/1983 | Resh | 324/61 |
| 4,499,111 | 2/1985 | Oetiker et al. | 426/231 |
| 4,599,809 | 7/1986 | Parkes | 43/31 |
| 4,750,273 | 6/1988 | Parkes et al. | 34/30 |
| 4,868,491 | 9/1989 | Black | 324/65 |
| 4,896,795 | 1/1990 | Ediger et al. | 222/63 |
| 4,916,830 | 4/1990 | Braun et al. | 34/48 |
| 4,916,888 | 4/1990 | Sheehan et al. | 56/DIG. 15 |
| 4,951,031 | 8/1990 | Strubble | 56/10.2 |

OTHER PUBLICATIONS

"Composite Model of the Complex Permittivity of Cereal Grain" by A. Kraszewski S. O. Nelson, 1989 British Society for Research in Agricultural Engineering.
"Dielectric Properties of Selected Vegetables and Fruits 0.1–10.0 GHz" by V. N. Tran, S. S. Sluchly and A. Kraszewski 1984 Journal of Microwave Power.
"Automatic System for Dielectric Properties Measurements from 100 kHz to 1 GHz" by K. Lawrence, S. Nelson and A. Kraszewski 1989 Jan.–Feb. Transactions of the ASAE.
Pamphlet ALMACO—"Seed Spector II".
Pamphlet ALMACO—"Almaco Research Plot Combines".
Pamphlet DMC—"Combine Calc-U-Dri—Monitors grain moisture as you are harvesting".

*Primary Examiner*—Terry Lee Melius
*Attorney, Agent, or Firm*—Wallenstein, Wagner & Hattis, Ltd.

[57] ABSTRACT

A method and an apparatus for determining the moisture content of grain to be harvested comprising the steps of reaping grain from grain bearing plants, threshing grain from the grain bearing plant, collecting the threshed grain in a hopper, and sensing the moisture content of the threshed grain prior to collection of the grain in the hopper.

36 Claims, 6 Drawing Sheets

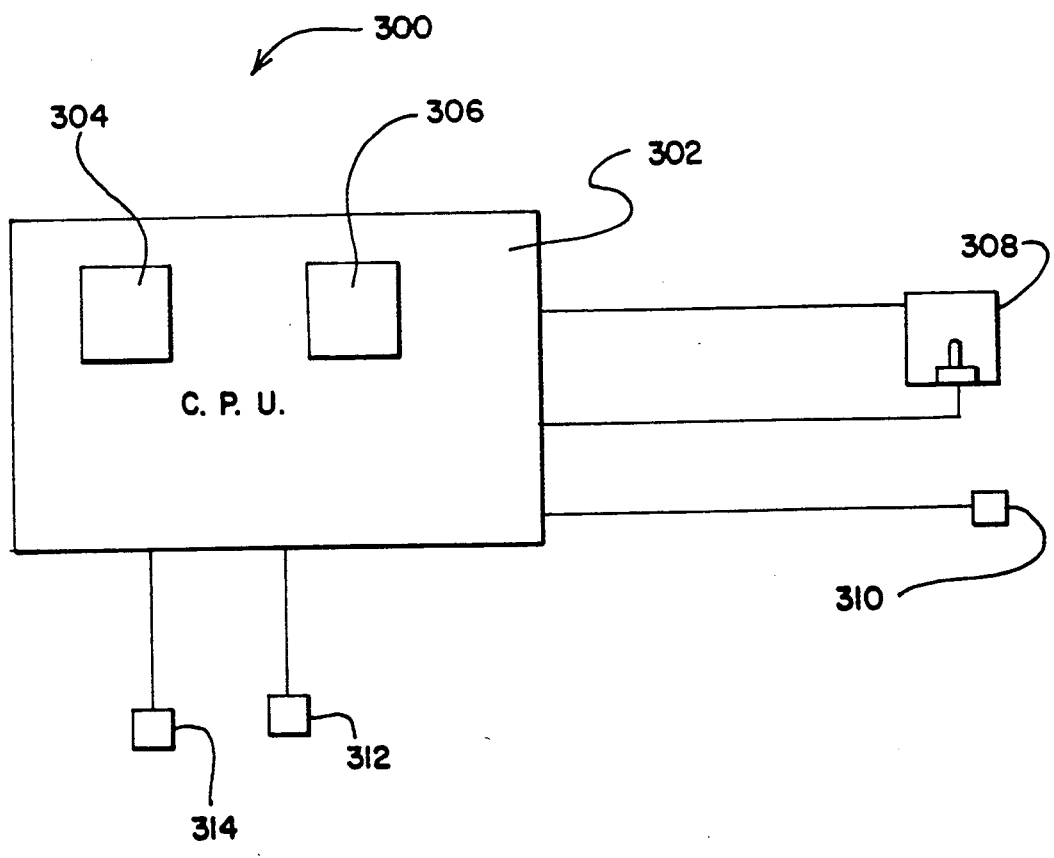

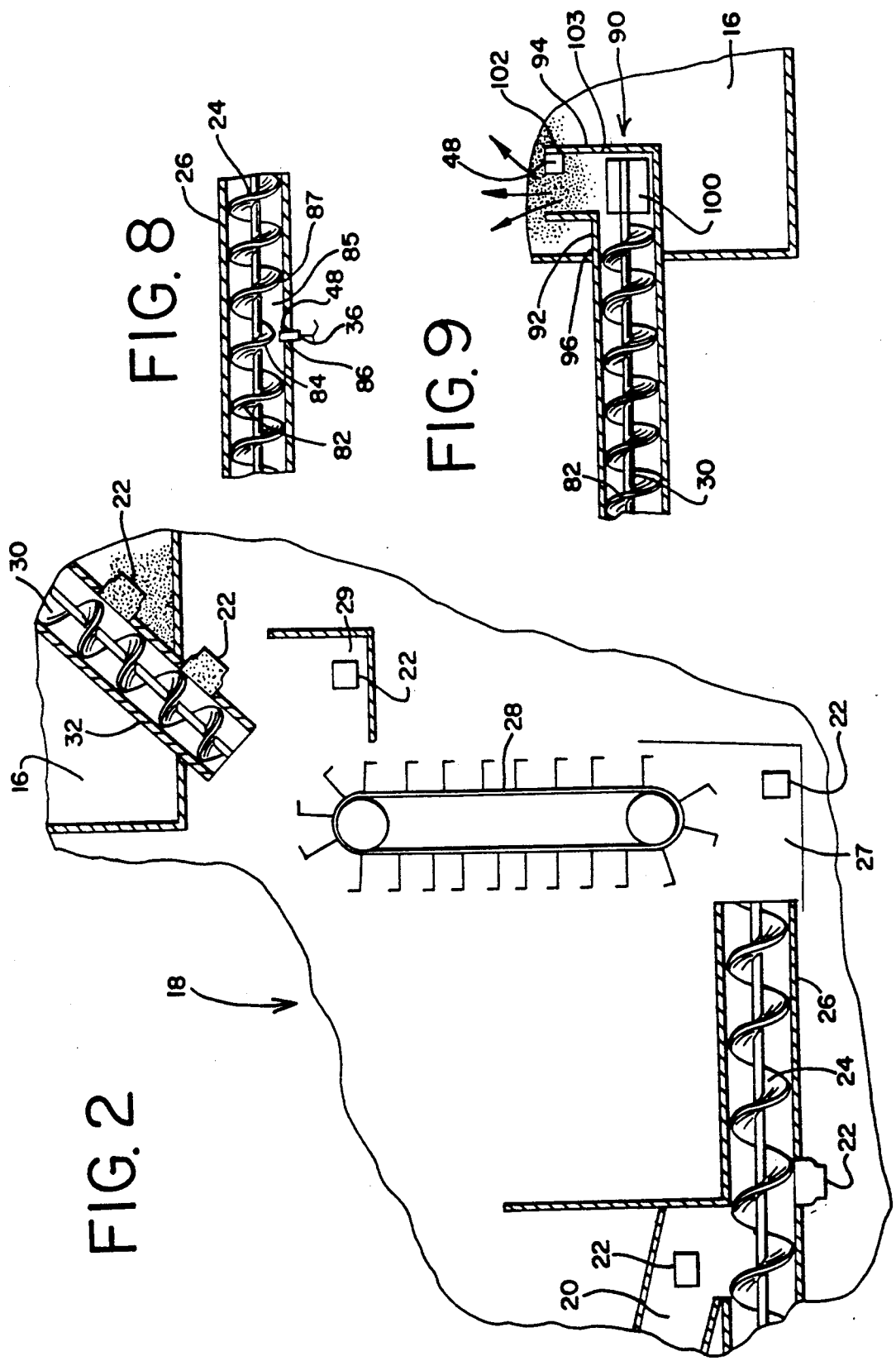

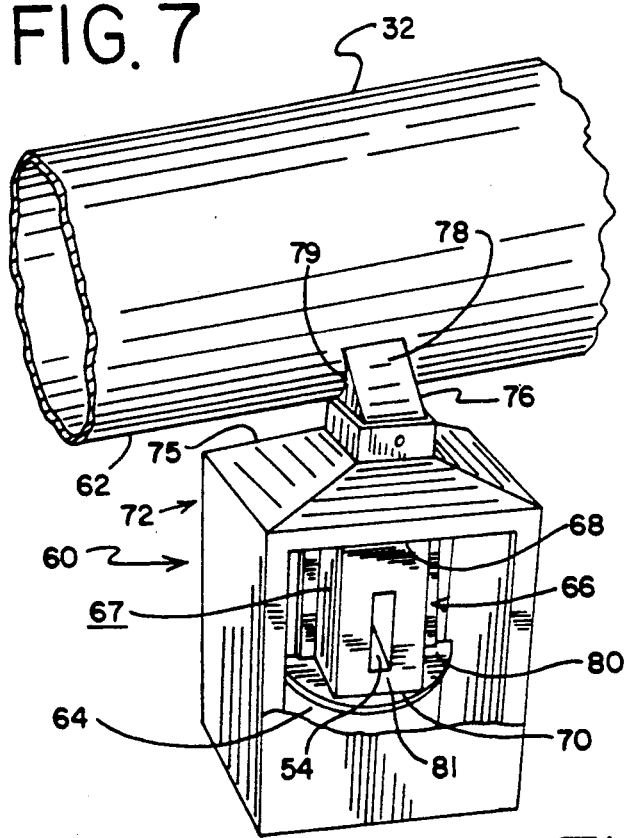
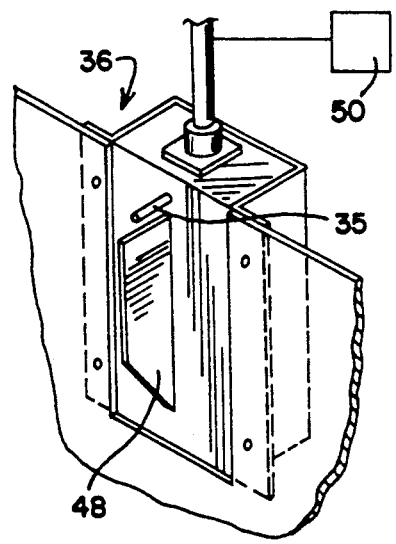
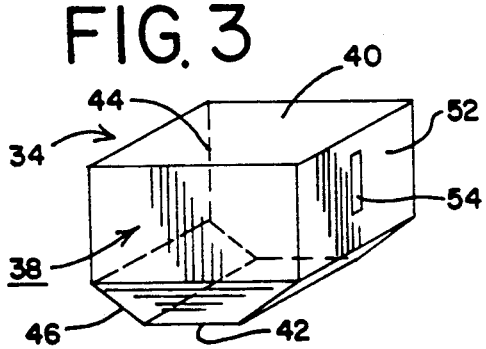
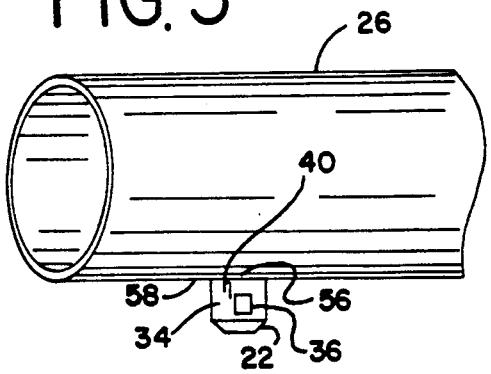
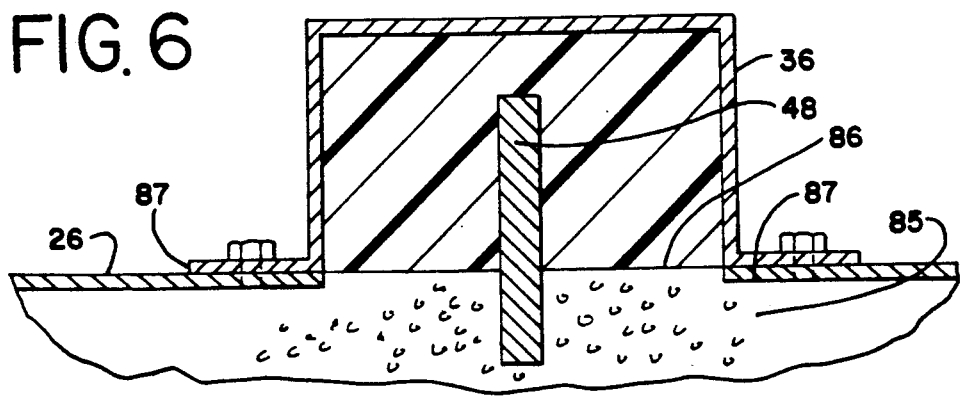

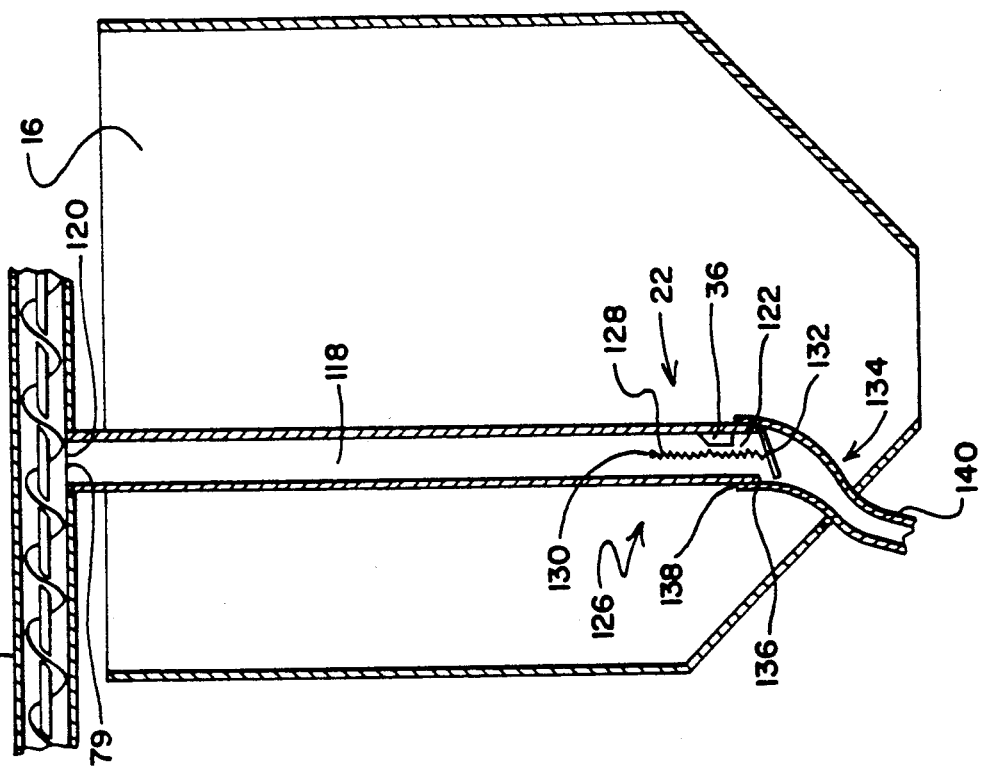
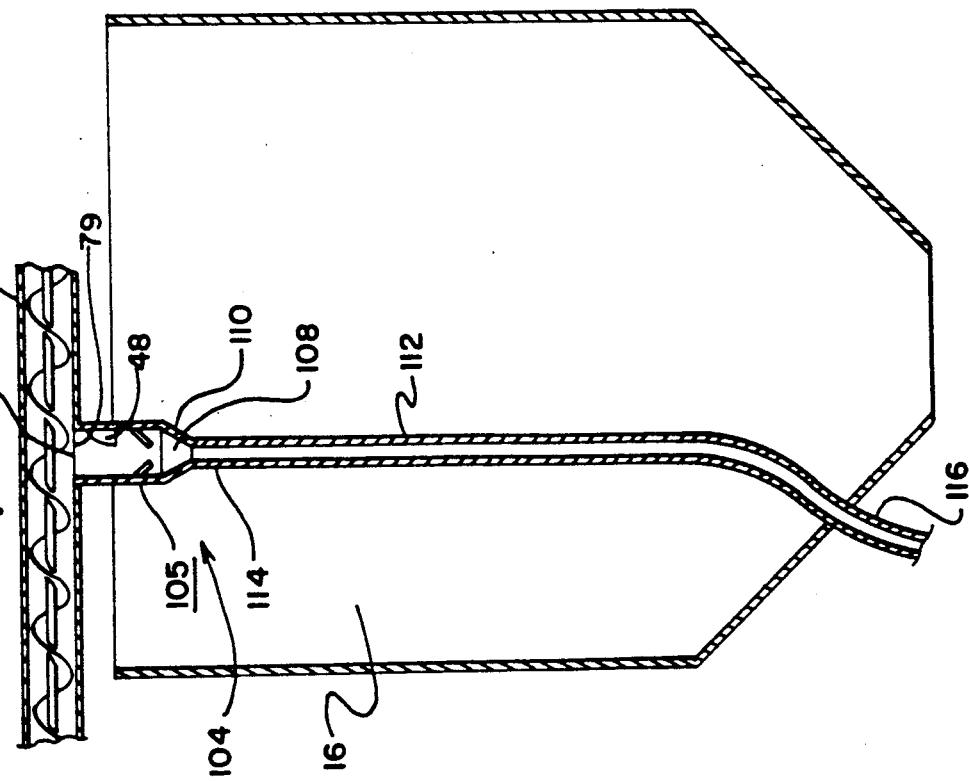

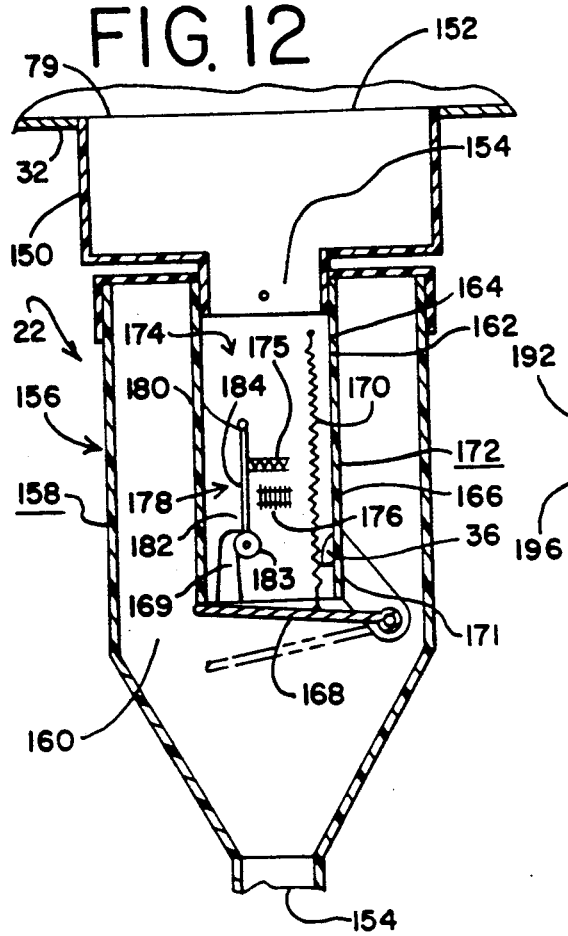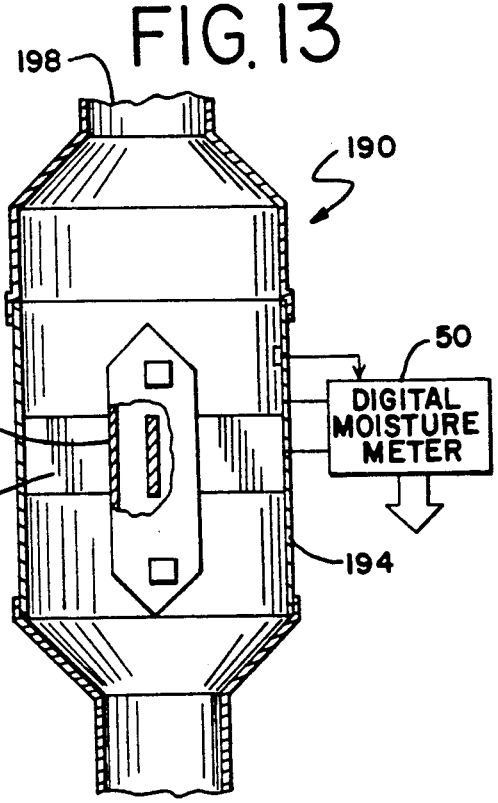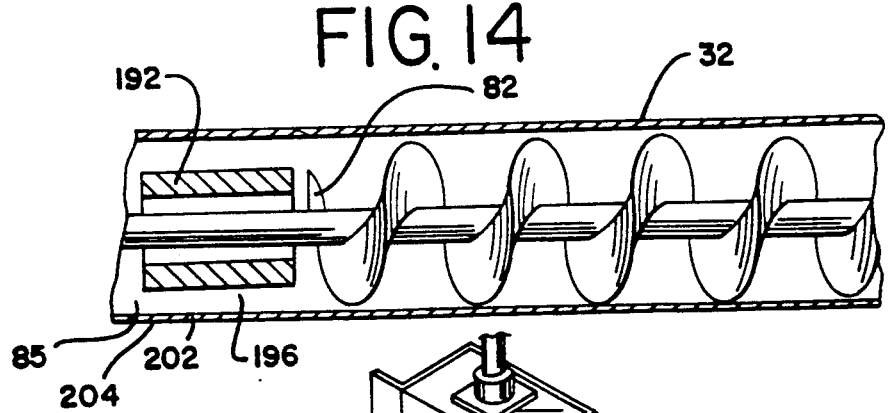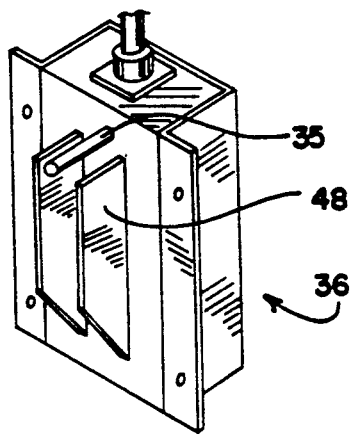

METHOD AND APPARATUS FOR QUALITATIVELY MEASURING CHARACTERISTICS OF GRAIN TO BE HARVESTED

DESCRIPTION

Technical Field

The present invention relates to a method and apparatus for continuously determining the moisture content of grain being harvested and communicating to the operator of the harvesting equipment the moisture content.

BACKGROUND OF THE INVENTION

Grain typically is harvested by a combine which reaps the grain, threshes the a hopper. The threshed grain is then ultimately transferred from the combine's hopper to a storage bin. To prevent spoilage, of the grain in the bin, grain must be sufficiently dry prior to storage or immediately dried in the storage bin to prevent spoilage. If the moisture content of freshly harvested grain is too high, then it requires significant energy to dry the same. Obviously it is desirable to harvest at the lowest possible moisture conditions to reduce cost of drying.

Grain dryers such as those disclosed in U.S. Pat. No. 4,599,809 and U.S. Pat. No. 4,750,273 disclose a method and a system utilizing heat to dry freshly harvested grain to a desired moisture content. However, the process of drying wet grain is expensive because of the energy required to heat the grain, as well as the energy required to operate electrical equipment necessary to circulate and sample the grain. For this reason it is desirable to harvest grain with a moisture content as close as possible to that of the desired storage level and thereby minimize the amount of drying required.

In the past, farmers would visually inspect the fields, and harvest what appeared to be the driest portions of their fields first. However, because the moisture content of the grain in the field can vary greatly, this method is inherently inaccurate. For a more accurate measurement, farmers would harvest a small section and then use a hand held moisture sensor to determine the moisture content of grain in the combine's hopper. This required the farmer to stop the combine, climb out of its cab, climb up to the hopper and obtain a sample full of grain to be put through the moisture sensor. This was not only time consuming but also inaccurate since dry grain could be mixed with that having a higher moisture content and could lead to inaccurate measurements.

Other combine moisture sensors are designed to accumulate a hopper full of grain from an entire test plot and give a moisture reading of the entire hopper. Once again, this does not yield continuous moisture data to the operator of a combine to determine the desirability of harvesting grain.

The present invention solves these and other problems by allowing the operator of the combine to continuously sample the grain for moisture content without leaving the cab.

Further, the moisture sensor could be replaced by a different type of sensor to qualitatively measure other characteristics of grain such as oil content, protein content, test weight, foreign matter, starch content, sugar content and other qualitative measurements. This data may be similarly reported to an operator of a combine continuously during harvesting.

SUMMARY OF THE INVENTION

The present invention provides a method and apparatus for determining the desirability of harvesting grain. According to the present invention the moisture content of grain being harvested is continuously monitored by a grain moisture sensor mounted on a combine. The combine reaps and threshes the grain and transports the threshed grain to a hopper. The moisture sensor may be mounted or located in one of a series of augers or elevators that moves threshed grain from the thresher to the hopper. The grain moisture data are reported to the operator of the combine so that the operator may have continuous monitoring and thus harvest the grain having an optimal moisture content.

The moisture sensor could be replaced by sensors for sensing different characteristics of grain without departing from the scope of this invention.

BRIEF DESCRIPTION OF DRAWINGS

FIG. 1A/shows a schematic representation of the system of the present invention;

FIG. 2 is a schematic representation of a conventional grain transfer member a combine;

FIG. 3 is an isometric view of a grain sample cell;

FIG. 4 is an elevational view of a conventional capacitance-type moisture sensor;

FIG. 5 is an elevational view of an auger tube having a sample cell appended thereto;

FIG. 6 is a sectional view taken along the lines 6—6 of FIG. 4;

FIG. 7 is another embodiment of a sample cell appended to a section of auger tubing;

FIG. 8 is a schematic representation of a moisture sensor inserted into an auger having a section of the auger flighting removed to accommodate the moisture sensor;

FIG. 9 is a schematic representation of the fill auger tube having a section of the flighting replaced with paddles and an auger tube that has a chute facing substantially upward.

FIG. 10 is another embodiment of a moisture sample cell with a sample return to the thresher;

FIG. 11 is a diagrammatic view of a spring operated batch sampling moisture cell;

FIG. 12 is a diagrammatic view of another spring operated batch sampling moisture cell;

FIG. 13 is a diagrammatic sectional view of another moisture sample cell;

FIG. 14 is a cross sectional view of a cylindrical capacitance electrode disposed within an auger tube;

FIG. 15 is an elevational view of a conventional double plate capacitance probe.

DETAILED DESCRIPTION

Figure 1:
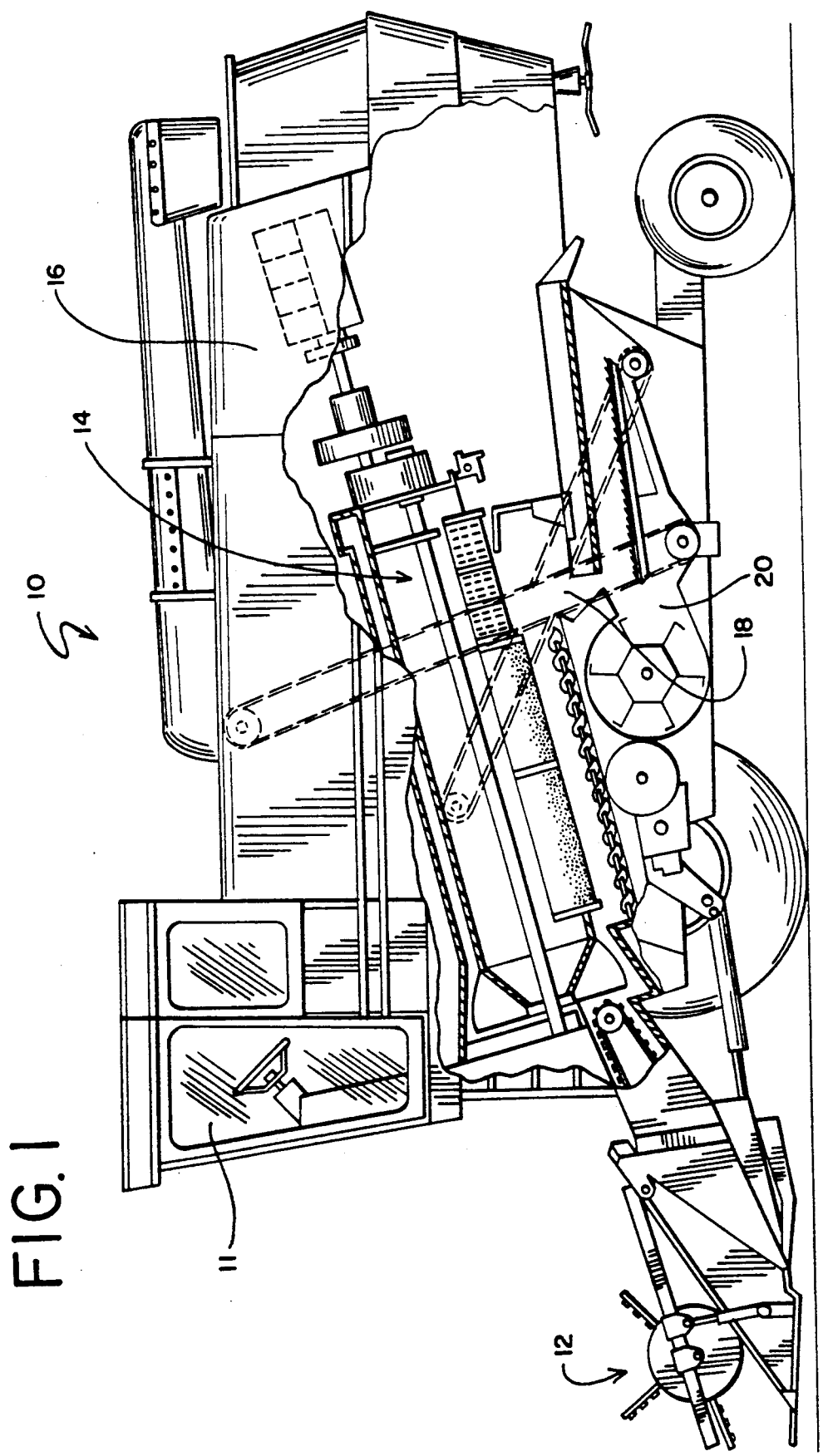
FIG. 1 is an elevational view of a conventional combine.

While this invention is susceptible of embodiment in many different forms, there is shown in the drawings and will herein be described in detail a preferred embodiment of the invention. The present disclosure is to be considered as an exemplification of the principles of the invention and is not intended to limit the broad aspect of the invention to embodiments illustrated.

FIG. 1 shows a conventional combine 10 having an operator's cab 11, a reaper 12, a thresher 14, a hopper 16, and a transport member 18 that carries the grain from an output of the thresher 14 to the hopper 16. The hopper 16 may either be onboard the combine 10 or be a wagon pulled behind or alongside the combine 10.

Generally the reaper 12 gathers grain-bearing plants from a field and conveys the plants into the thresher 14. The thresher separates grain from the grain-bearing plants and deposits the separated grain into a lower portion 20 of the combine 10. Grain typically, includes corn, wheat, soybeans, oats, rice, flax, barley, canola, rape, rye, beans, milo (sorghum), peas, forage and turf seeds, sunflower seeds and vegetable seeds.

FIG. 1A shows a schematic diagram of a system 300 for calculating and displaying grain moisture content being harvested by combine 10. The system comprises a central processing unit 302 that is preferably mounted in the operator's cab 11 and capable of calculating and displaying the moisture content of grain being harvested 304, and the temperature of grain being harvested 306. Necessarily, the central processing unit 302 must be responsive to signals from a means for measuring the moisture content of grain being harvested 308, and a means for measuring the temperature of grain 310 being harvested. Output port 312 is provided for interfacing to a printer or other devices. Preferably, the port is of a conventional type such as the RS232.

The central processing unit 302 may be adapted to be responsive to signals from sensors that sense other characteristics of grain and to process these signals to provide valuable information to an operator of a combine.

The CPU 302 also includes input means 314, such as a keypad, so that the operator may select, for example, the type of grain being harvested so that the proper temperature compensation data may be used.

According to the invention, a moisture sensor assembly 22 may be provided in the combine. (The combine 10 could also be a sheller or nonmobile threshing machine.) Preferably the moisture sensor assembly 22 is placed in the grain transport member 18 or adjacent the grain transport member because the grain is necessarily volumetrically concentrated and continuously moving to provide a homogeneous sample.

For example, FIG. 2 schematically discloses a conventional transport member 18 having a draw auger 24 enclosed within a draw auger tube 26, a first grain transfer bin 27, a grain elevator 28, a second grain transfer bin 29, and a fill auger 30 enclosed within a fill auger tube 32. Draw auger 24 transports grain inside the draw auger tube 26 from a lower portion 20 of combine 10 to the first grain transfer bin 27. Grain elevator 28 transports the grain from the first bin 27 to the second grain transfer bin 29. Fill auger 30 transports the grain inside the fill auger tube 32 from the second bin 29 to the hopper 16 for temporary storage until it is unloaded into a wagon or truck for transfer to a storage bin.

In the first embodiment of the present invention, the moisture sensor assembly 22 comprises a sample cell 34 as shown in FIG. 3 and a moisture sensor 36 more clearly shown in FIG. 4. The moisture sensor 36 has a plate 48 which detachably mounts onto the sample cell 34. The moisture sensor 36 includes a grain temperature sensor 35 to measure the temperature of a grain sample for compensation of the measured dielectric constant which is affected by the temperature of the grain sample. The moisture sensor assembly 22 is attached to the draw auger tube 26 so that the sample cell 34 may receive a continuous flow of grain from the draw auger tube 26 so that the grain will fill the cell 34 and the moisture content may be continuously measured.

Sample cell 34 is substantially rectangular in shape having four walls 38, a top opening 40, a bottom opening 42, and a chamber 44 therebetween inter-connecting the top and bottom openings 40 and 42. A portion of each wall 3 of sample cell 34 inwardly tapers 46 proximate the bottom opening 42 so that the bottom opening 42 is smaller than the top opening 40. Taper 46 restricts a flow of grain through the sample cell 34 to ensure a full measure of grain for each sample to provide a more accurate capacitance measurement.

The moisture sensor 36 has a single plate 48 which forms with the walls 38 of the cell 34, a capacitance type sensor. The moisture sensor 36 has its single sensor plate 48 connected to a digital moisture meter 50 of conventional design. The wall 38 of the cell 34 is also connected to the moisture meter 50. The function of the moisture meter 50 may be accomplished by the CPU 302. The CPU 302 is controlled by a conventional microprocessor such as a 65C02.

The moisture meter 50 is calibrated using air as a reference dielectric which is compared to the capacitance of the grain forming the dielectric. The meter 50 also preferably employs temperature compensation circuitry that is connected to the grain temperature sensor 35 which adjusts the moisture content in relation to the sample temperature. Discussion of this measurement technique is found in U.S. Pat. Nos. 4,559,809 and 4,750,273, described above, and is incorporated herein by reference.

The temperature compensation varies with different types of grains being harvested because the temperature coefficients of the grains vary when measured by capacitance. Accordingly, the temperature coefficients of various grains are entered into the CPU 302 before harvesting. The operator of the combine 10 selects the appropriate type of grain before harvesting to attain more accurate temperature compensation and more accurate moisture content data.

One of the walls 52 of the sample cell 34 has a facial portion removed to form a longitudinally extending slot 54. Slot 54 is adapted to receive the sensor plate 48, centrally. Moisture sensor 36 mounts on the sample cell 34 to form the moisture sensor assembly 22. Sensor plate 48 fits into the slot 54 and extends into the chamber 44 of the sample cell 34 so that the sensor plate 48 may contact grain flowing through sample cell 34 to measure the grain moisture. The walls 38 of the sample cell 34 are made of a conductive material such as metal so that the walls 38 will serve as a second capacitance plate.

A portion of draw auger tube 26 is removed to form an opening 56. Moisture sensor assembly 22 is attached to a lower portion 58 of the draw auger tube 26 (FIG. 5), so that the top opening 40 of the sample cell 34 is in alignment with the tube opening 56 to provide a continuous flow of grain through the sample cell 34.

As grain moves through the draw auger tube 26 a portion of the grain falls through the tube opening 56 and through the sample cell 34. The flow of grain is restricted by the smaller bottom opening 42 of the sample cell 34, thereby providing a full measure of grain continuously in the sample cell 34 and surrounding the sensor plate 48. The sensor plate 48 serves as one blade of a capacitor while the walls 38 of the sample cell 34 adjacent the sensor plate 48 serve as the second capacitance plate.

The capacitance of the sample cell 34, as measured by the meter 50, is varied by the dielectric constant of any material that is present in the sample cell 34. The dielectric constant varies, for the most part, with the type of grain and the moisture content of the grain. The moisture meter 50 is operative to relate the moisture content of a sample of grain to the capacitance of the sample cell 34 with the sample therein. This is displayed on a meter in the cab 11 of combine 10, or on a more permanent record.

A second embodiment of the present invention involves a similar set-up as described above, but the moisture sensor assembly 22 is attached to the fill auger tube 32, or located at the lower portion of the combine 20, or in the first or second grain transfer bins 27, 29 or in the grain elevator 28.

A third embodiment of the present invention provides for attachment of the moisture sensor assembly 22 on the fill auger tube 32 within the hopper 16. Inasmuch as the sample cell 34 is inside the hopper 16 and may be surrounded by grain, additional housing must be provided to allow for continuous batch sampling.

FIG. 7 shows a portion of fill auger tube 32 having a sample cell housing 60 appended at a lower portion 62 of the fill auger tube 32. Sample cell housing 60 is substantially rectangular in shape defining a void 64. A rectangular sample chamber 66 having walls 67, an upper and lower opening 68, 70, mounts to the sample chamber housing 60 within the void 64. A top portion 72 of the sample chamber housing 60 tapers 75 inward and upward, terminating at an attachment member 76.

The attachment member 76 is adapted to attach to a circumferential portion of the auger tube 32. The attachment member 76 defines a channel 78 opening into the upper opening 68 of the sample chamber 66. Channel 78 is in alignment with a hole 79 cut in the fill auger tube 32 to provide a flow of grain through the sample chamber 66.

A portion 81 of walls 67 has a longitudinally extending slot 54 adapted to receive the sensor plate 48 to provide moisture measurement of grain in the sample chamber 66.

A rotatable semicircular disk 80 closes off the lower opening 70 of sample chamber 66 thereby blocking the flow of grain through the sample chamber 66 to permit a full sample of grain to accumulate around the sensor plate 48. The disk 80 is motor driven through a gearbox (not shown) that rotates the disk to permit discharge of the grain sample into the hopper 16 or the void 64 after the moisture content has been measured.

Even though the sample chamber housing 60 sits within the hopper 16 and grain fills up around the outside, the void 64 is of sufficient volume to allow continuous batch sampling throughout a harvest procedure until the onboard hopper 16 is full.

A fourth embodiment of the present invention provides for attaching the moisture sensor 36 onto the draw auger tube 26 (FIG. 6). A portion of the sensor plate 48 extends into the draw auger tube 26 to be in direct contact with grain as it flows through the draw auger tube 26. FIG. 8 shows a portion of draw auger 24 having flighting 82 enclosed within the draw auger tube 26. A portion 84 of the flighting 82 is removed in order to form a sample area 85. (It is also possible to put moisture sensor 36 at an end of the draw auger 24 so that it is not necessary to remove a section of the flighting 82.) A portion of draw auger tube 26 is removed proximate the sample area 85 to form a bore 86 to receive the sensor plate 48.

The moisture sensor 36 is attached to the outside of the draw auger tube 26 and the sensor plate 48 is inserted into bore 86 so that the sensor plate 48 may continuously contact grain in the sample area 85. Sensor plate 48 and a portion 87 of the draw auger tube 26 adjacent the sensor plate 48 serve as the two capacitor plates to measure the moisture content of the grain passing through the draw auger tube 26. The moisture content is continuously displayed in the cab 11 of the combine 10, or permanently recorded.

A fifth embodiment of the present invention is similar to the fourth embodiment, but the sensor plate 48 is located inside the fill auger tube 32 or the lower portion of the combine 20, or in the first or second grain transfer bins 27, 29 or in the grain elevator 28.

FIG. 9 shows a sixth embodiment of the present invention. A substantially L-shaped chute 90 has first and second ends 92, 94. The first end 92 is adapted to fit over and attach to an endmost portion 96 of the fill auger tube 32 located within the hopper 16. The second end 94 of the chute 90 faces substantially upward.

Preferably, the flighting 82 at the end of the fill auger 30 is removed and replaced with paddles 100 adjacent the second end 94 of the chute 90. A moisture sensor 36 is mounted on an inner portion 102 of the chute 90 at the second end 94 of chute 90 above the paddles 100. A portion of sensor plate 48 extends into chute 90 where it is in continuous contact with the grain flowing through the chute 90.

Paddles 100 rotate along with fill auger 30 and push grain upward filling the chute 90 with grain and across the sensor plate 48 and out through the second end 94 of chute 90 and into the hopper 16. The inner portion 103 of the chute 90 immediately adjacent the sensor plate 48 serves as the second capacitance plate, and moisture measurement is accomplished as described above.

FIG. 10 shows another embodiment of the moisture sensor assembly 22. A substantially circular sample cell 104 has walls 105, a grain inlet 106 and a grain outlet 108. The grain inlet 106 is in alignment with the fill auger tube opening 79 to permit a continuous flow of grain through the sample cell 104. The sample cell 104 may be mounted anywhere on the fill auger tube 32 where the cell 104 will receive a measurable quantity of grain. The walls 105 of sample cell 104 taper 110 inward and downward proximate the grain outlet 108 of the sample cell 104 to restrict the flow of grain through the sample cell 104.

A tube 112 has first and second ends 114, 116 respectively. The tube 112 is preferably two to three inches in diameter and made of plastic. The first end 114 of the tube 112 is adapted to fit over the grain outlet 108. The second end 116 is in grain communication with the grain thresher 14 to return sampled grain to the thresher 14. It is equally possible to return the grain to any point along the grain transport member 18. (The grain thresher 14 and the transport member 18 may be collectively referred to as a grain processing stream.) Therefore, the moisture content of grain may be continuously monitored throughout the entire harvest procedure and the sampled grain returned to the thresher 14.

FIG. 11 shows another embodiment of the moisture sensor assembly 22. A hollow pipe 118 having a grain inlet 120 and a grain outlet 122 is attached to a portion 124 of fill auger tube 32. The grain inlet 120 is in alignment with the hole 79 cut in the fill auger tube 32 to provide a flow of grain through the pipe 118. The moisture sensor 36 is positioned proximate the grain outlet 122, and reports grain moisture data as discussed above.

A spring loaded closure mechanism 126 is provided proximate the grain outlet 122 to allow for either closure of the grain outlet 122 or to restrict a flow of grain flowing through the pipe 118. The closure mechanism 126 comprises a spring 128 attached to an outside portion 130 of a flapper valve 132. The spring 128 has a tension that may be overcome by a predetermined amount of grain thereby allowing the flapper valve 132 to open and discharge a sample of grain. The spring 128 has sufficient tension to return the flapper valve 132 into a closed position to close off the grain outlet 122 or to nearly close the outlet 122 to substantially restrict the flow of grain through the pipe 118.

A hose 134 has its first end 136 adapted to fit over an endmost portion 138 of the pipe 118. The second end 140 of the hose 134 is in grain communication with the thresher 14 and returns sampled grain to the thresher 14. The grain may also be returned to any point along the grain transport member 18.

FIG. 12 shows another embodiment of the moisture sensor assembly 22. A plastic saddle 150 has a grain inlet 152 and grain outlet 154. The grain inlet 152 is in alignment with the fill auger tube hole 79 to permit a flow of grain through the saddle 150. A housing 156 has walls 158 that define a void 160. A sample chamber 162 having first and second ends 164, 166 is mounted to the housing 156 inside the void 160. The first end 164 of the sample chamber 162 is adapted to fit over the grain outlet 154 of the saddle 150 to provide a flow of grain into the sample chamber 162.

A flapper valve 168 having a lip 169 at its distal end is hingedly connected to the sample chamber 162 and is movable from an open position to a closed position by a closure spring 170 to permit a sample of grain to accumulate in the sample chamber 162. Moisture sensor 36 is attached to a portion 171 of a chamber wall 172 proximate the second end 166 to measure the moisture content of a grain sample as discussed above.

The opening and closing of the flapper valve 168 is controlled by a valve latch 174 operated by a latch spring 175 and an electromagnet 176. A latch arm 178 has a first end 180 attached to the chamber wall 171, and a second end 182 has a roller 183. An intermediate portion 184 of the latch arm 178 is responsive to magnetism.

The flapper valve 168 is held shut when the latch arm 178 is forced outward by the latch spring 175 causing the roller 183 to engage the lip 169 of the flapper valve 168 thereby holding the flapper valve 168 shut.

To open the flapper valve 168, a current is provided to the electromagnet 176 attracting the responsive portion 184 of the latch arm 178. The electromagnet has a sufficient magnetic field to overcome a tension in the latch spring 175 thereby moving the roller 183 away from the lip 169 of the valve 168. The weight of the grain in the chamber 162 is then sufficient to overcome a tension in the closure spring 170 forcing the valve 168 open and discharging the contents of the chamber 162.

The valve 168 is returned to the closed position by the closure spring 170 providing sufficient tension to reset the valve 168. The current to the electromagnet 176 is then shut-off allowing the latched spring 175 to push the latch arm 178 outward so that roller 183 may engage lip 169 and hold the flapper valve 168 closed to accumulate another sample of grain.

It should be understood that sample cells of differing shapes and dimensions other than those described above are contemplated by this invention. Further, it is contemplated that a sample cell may be opened and shut by various power closure means or devices such as motors, solenoids, gravity, hydraulics, pneumatics, and hand activated controls.

FIG. 13 shows a cylindrical sample cell 190 that may be attached to either the fill auger tube 32 or draw auger tube 26 as described above. The cylindrical sample cell 190 functions as a capacitor and is more fully described in U.S. Pat. Nos. 4,559,809 and 4,750,273 and is incorporated herein by reference.

The sample cell 190 is a cylindrical capacitor which is connected to the capacitance digital moisture meter 50. The cell 190 includes an inner conductive cylindrical electrode 192 positioned coaxially within an outer conductive cylindrical electrode 194, thereby defining an annular active region 196 of the cell 190. The sample cell 190 has a grain inlet 198 into the annular active region 196 and a sample cell closure means 200 more fully disclosed in the above incorporated patents.

The sample cell 190 is mounted to either the draw auger tube 26 or fill auger tube 32 or anywhere between the thresher 14 and the hopper 18 so that grain inlet 198 is in alignment with the tube openings 56 and 79 to provide a flow of grain into the annular active region 196 of the sample cell 190. The grain moisture measurement is more fully described in the above referenced patents.

FIG. 14 shows a variation of the above described cylindrical capacitance cell 190. The inner capacitance cell 192 is mounted inside either the draw auger tube 26 or fill auger tube 32 in the sample area 85 provided by removing a section of auger flighting 82. An annular portion 202 of the auger tube 26 or 32 immediately adjacent the inner cylindrical capacitance electrode 192 serves as the second conductive electrode 204. Annular active region 196 lies between the electrode 204 and the inner cylindrical electrode 192. The capacitance of a grain sample in the annular active region 196 is measured as described above.

It should be understood that the present invention contemplates measuring the moisture content of grain anywhere during transportation of grain from the thresher 14 to the hopper 16 and reporting the moisture content to a display in the cab 11 or elsewhere. The moisture content may be measured continuously; periodically over a preselected or random time interval; or on demand throughout an entire harvest procedure. Preferably, several moisture content readings are taken and averaged by the CPU 302 and displayed. The moisture content data may be reported, recorded, or transmitted by any usual means such as radio frequency, sonic, optical, wires, wireless, or electromagneticly. The moisture data may be used for any means such as displays, printouts, magnetic records, memory devices, analog meters, warning devices, inputs into other controls, and/or used to make adjustments in the combine machinery.

Further, it is contemplated that the grain may be transferred by means other than a combination of augers and elevators. For example, grain may be pushed or pulled through a tube with air or grain may be transferred by conveyors or other means.

It should also be understood that the present invention contemplates measuring the moisture content by any method that yields accurate moisture content data, and should not be limited to only measurement by capacitance. For example, moisture content may be measured by optical, infrared, sound, microwaves, heat or conductance.

One advantage of the present invention is that the moisture sensor 36 may be readily retrofitted to currently existing combines to provide grain moisture data to the operator of the combine 10. The embodiments utilizing sample cells may be easily attached to an existing combine by simply cutting an opening in an auger tube and attaching the sampling cells described above. Obviously, the capacitor plate 48 can be mounted in an auger tube by removal of a section of flighting.

Those embodiments utilizing a sample cell are more advantageous in that they resist accumulation of foreign materials. In combining beans and similar crops which are close to the ground, dirt is picked up and tends to accumulate on the inside of an auger tube in the clearance between the flighting and the inside wall of the tube. This will tend to short out the sensor plate or provide inaccurate readings. The continuous sampling cell does not have this disadvantage. In addition, two sensor plates spaced and insulated from each other may be utilized in lieu of using the auger tube or cell wall as a second plate.

It is further contemplated that the moisture sensor may be replaced by a grain sampler or sensor for sensing various characteristics of grain such as oil content, test weight, foreign matter, starch content, protein content, sugar content or other qualitative measurements.

While the specific embodiments have been illustrated and described, numerous modifications come to mind without significantly departing from the spirit of the invention and the scope of protection is only limited by the scope of the accompanying claims.

We claim:

1. A grain moisture sensing system for monitoring the moisture content of grain being threshed comprising:
a combine having a grain thresher, a storage hopper, and a series of connected auger tubes between said thresher and said storage hopper;
a grain moisture sensor disposed within said series of auger tubes, said grain moisture sensor having a cylindrical conductive inner electrode positioned coaxially within said series of auger tubes to define an annular active region between said auger tube and said inner electrode;
said auger tube adjacent said annular active region acting as an outer electrode; and,
a moisture meter connected to said inner and outer electrode and operative to provide a moisture signal having a property which is related to the dielectric constant of a grain sample in said annular active region in said draw auger tube.

2. A grain moisture sensing system for monitoring the moisture content of grain being threshed comprising:
a combine having a grain thresher, a storage hopper, and a series of connected auger tubes between said thresher and said storage hopper, said series of auger tubes having a portion of said auger tube removed forming an opening;
a grain sample cell mounted on said auger tube and adjacent said auger tube opening for collecting a sample of grain outside said auger tube, said sample cell having walls and a top and bottom opening, said top opening of said sample cell being in alignment with said auger tube opening to permit a continuous flow of grain through said sample cell;
a moisture sensor extending into said sample cell; and,
a moisture meter connected to said moisture sensor and operative to provide a moisture signal having a property which is related to the dielectric constant of a grain sample in said sample cell.

3. The system of claim 2, wherein said moisture sensor comprises:
a single capacitance plate having at least or portion of said plate extending into said sample cell;
a portion of said wall of said sample cell adjacent said plate acting as a second capacitance plate.

4. The system of claim 2, wherein said moisture sensor comprises:
a pair of capacitance plates in spaced relation, having a portion of said plates extending into said sample cell.

5. A grain moisture sensing system for monitoring the moisture content of grain being threshed comprising:
a combine having a grain thresher, a storage hopper, and a series of connected auger tubes between said thresher and said storage hopper, said series of auger tubes having a portion of said auger tube removed forming an opening;
a grain sample cell mounted adjacent said auger tube opening, said sample cell having a cylindrical conductive outer electrode having a top and bottom opposed openings, said outer electrode having an axis which is positioned vertically;
a cylindrical conductive inner electrode having opposed openings and positioned coaxially within said outer electrode with the ends of said inner electrode in vertically spaced relation to the ends of said outer electrode to define an annular active region of said sample cell;
said top opening of said outer electrode being in alignment with said auger tube opening to permit a flow of grain into said annular active region; and,
a moisture meter connected to said inner and outer electrode and operative to provide a moisture signal having a property which is related to the dielectric constant of a grain sample in said annular active region;
sample cell closure means positioned at a lower end of said sample cell wherein said closure means is closed to allow the filling of said sample cell with grain and is opened to discharge said grain sample from said sample cell so that an operator of a combine may obtain batch sample moisture data of grain being harvested.

6. The system of claim 5, wherein said sample cell closure means includes a power closure device.

7. The system of claim 6, wherein said power closure device includes a closure motor.

8. A grain moisture sensing system for monitoring the moisture content of grain being threshed comprising:
a combine having a grain thresher, a storage hopper, a fill auger tube between said thresher and said storage hopper, said fill auger tube having an endmost portion extending within said hopper, a section of said endmost portion of said fill auger tube being removed to form an opening;
a housing defining a void, said housing being proximate the fill auger tube opening;
a grain sample cell disposed within said void of said housing, said sample cell having a grain inlet and a grain outlet at opposed ends, said sample cell having an internal channel connecting said grain inlet and said grain outlet, said grain inlet being in alignment with said auger tube opening to permit the flow of grain through said sample cell;

a sensing means extending into said sample cell;

a moisture meter connected to said sensing means and operative to provide a moisture signal having a property which is related to the dielectric constant of a grain sample in said sample cell; and, a sample cell closure means located within said void of said housing and positioned at said grain outlet of said sample cell wherein said closure means is closed to allow the filling of said sample cell with grain and is opened to discharge said grain sample from said cell into said hopper so that an operator of a combine may obtain batch sample moisture data of grain being harvested.

9. The system of claim 8 wherein said closure means includes a power closure device.

10. The system of claim 9 wherein said power closure device comprises a rotatable disk driven by a closure motor.

11. The system of claim 8, wherein said void has a volume great enough to allow batch sampling throughout a entire harvest procedure.

12. A grain moisture sensing system for monitoring the moisture content of grain being threshed comprising:

a combine having a grain thresher, a storage hopper, a fill auger tube between said thresher and said storage hopper, said fill auger tube having an endmost portion extending within said hopper, a section of said endmost portion of said fill auger tube being removed to form an opening;

a housing defining a void, said housing being proximate said fill auger tube opening;

a cylindrical conductive outer electrode having a top and bottom opposed openings, said outer electrode having an axis which is positioned vertically, said outer electrode being disposed within said void of said housing;

a cylindrical conductive inner electrode having opposed openings and positioned coaxially within said outer electrode with the ends of said inner electrode in vertically spaced relation to the ends of said outer electrode to define an annular active region of said sample cell;

said top opening of said outer electrode being in alignment with said auger tube opening to permit a flow of grain into said annular active region; and sample cell closure means positioned at a lower end of said sample cell, wherein when said closure means is closed it permits the filling of said sample cell with grain and is opened to discharge said grain sample from said cell into said void;

a moisture meter connected to said inner and outer electrode and operative to provide a moisture signal having property which is related to the dielectric constant of said grain sample in said cell.

13. The system of claim 12 wherein said closure means includes a power closure device.

14. The system of claim 13 wherein said power closure means comprises a rotatable disk driven by a closure motor.

15. The system of claim 12, wherein said void of said housing has a volume great enough to allow for batch sampling during an entire harvest procedure.

16. A grain moisture sensing system for monitoring the moisture content of grain being threshed comprising:

a combine having a grain thresher, a storage hopper, and a series of auger tubes between said thresher and said storage hopper, said series of auger tubes having an endmost portion extending within said hopper, a section of said endmost portion of said auger tubes being removed to form an opening;

a housing having walls and a grain inlet and grain outlet at opposed ends, said housing having an internal channel connecting said grain inlet and said grain outlet, said grain inlet being in alignment with said auger tube opening to permit a flow of grain through said housing, said channel tapering inwardly proximate said grain outlet to restrict the flow of grain flowing therethrough;

a moisture sensor having at least a portion of said sensor extending into said housing;

a moisture meter connected to said moisture sensor and operative to provide a moisture signal having a property which is related to the dielectric constant of a grain sample in said housing; and, means for returning said grain to a grain processing stream.

17. The system of claim 16, wherein said means for returning said grain to said grain processing stream comprises:

a hose having first and second ends, said first end of said hose being adapted to fit over said grain outlet to receive a flow of grain, said second end of said hose being in grain communication with said grain processing stream.

18. A grain moisture sensing system for monitoring the moisture content of grain being threshed comprising:

a combine having a grain thresher, a storage hopper, a fill auger tube between said thresher and said storage hopper, said fill auger tube having an endmost portion extending within said hopper, a section of said endmost portion of said fill auger tube being removed to form an opening;

a pipe having first and second opposed ends, said first end of said pipe being attached to said fill auger tube, said first end of said pipe having a grain inlet in alignment with said fill auger tube opening permitting a flow of grain through said pipe, said second end of said pipe having a grain outlet;

a sensing means extending into said pipe;

a moisture meter connected to said sensing means and operative to provide a moisture signal having a property which is related to the dielectric constant of a grain sample in said pipe;

a pipe closure means proximate said grain outlet adapted to restrict the flow of grain through said pipe to permit an accumulation of a sample of grain; and, means for returning said grain to a grain processing stream.

19. The system of claim 18, wherein said means for returning said grain to said grain processing stream comprises:

a hose having first and second ends, said first end of said hose adapted to fit over said grain outlet, said second end of said hose being in grain communication with said grain processing stream, whereby grain may be continuously sampled and returned to said grain processing stream throughout the entire harvest procedure.

20. The system of claim 18, wherein said pipe closure means comprises:

a spring operated valve hingedly connected to said pipe proximate said grain outlet, wherein a predetermined amount of grain causes the valve to open and discharge a grain sample into said tube and after said grain sample is discharged said valve closes to accumulate another grain sample.

21. The system of claim 18, wherein said pipe closure means comprises:
a spring operated flapper valve hingedly connected to said pipe proximate said grain outlet, said valve being movable from an open position to a closed position by a closure spring, said valve having a lip at its distal end;
a spring loaded valve latch including a latch arm having first and second ends, said latch arm having a portion responsive to magnetism, said first end of said latch arm being rotatably attached to said pipe, said second end having a roller, said latch arm having an adjustable latch spring attached at an intermediate portion of said latch arm and operative to move said latch arm from an unlocked to a locked position, said roller being adapted to rotatably engage said lip of said flapper valve to hold said valve in said closed position when said latch arm is in said locked position;
an electromagnet magnetically engaging a portion of said latch arm and operative to move said latch arm from said locked position to said unlocked position.

22. A grain moisture sensing system for monitoring the moisture content of grain being threshed comprising:
a combine having a grain thresher, a storage hopper, a series of auger tubes between said thresher and said storage hopper said auger tubes having an end most portion extending within said hopper, said auger tubes having augers disposed within said auger tubes;
a chute having a grain inlet and a grain outlet and a channel connecting said grain inlet and grain outlet, said grain inlet of said chute being adapted to fit over and attach to an endmost portion of said fill auger tube, said grain outlet of said chute facing substantially upward;
a moisture sensor disposed inside said chute; and,
a moisture meter connected to said moisture sensor and operative to provide a moisture signal having a property which is related to the dielectric constant of said grain sample in said cell.

23. The system of claim 22 wherein said chute is substantially L-shaped.

24. The system of claim 22, wherein said moisture sensor includes:
a sensing means;
a moisture meter connected to said sensing means and operative to provide a moisture signal having property which is related to the dielectric constant of said grain sample in said cell.

25. The system of claim 24, wherein said sensing means includes:
a single capacitance plate having at least a portion of said plate extending into said chute proximate said grain outlet;
a portion of said chute adjacent said plate functioning as a second capacitance plate.

26. The system of claim 24, wherein said sensing means includes:
a pair of capacitance plates in spaced relation, having at least a portion of said plates extending into said chute proximate said grain outlet.

27. The system of claim 54, wherein said auger tubes includes:
paddles disposed within said auger tube adjacent said chute, said paddles adapted to rotate along with said auger, whereby grain will fill said chute and be continuously pushed past said moisture sensor for continuously monitoring the moisture content of grain being harvested.

28. A grain transfer tube comprising:
a means for moving grain through said transfer tube, said transfer tube having a portion removed to form an opening;
a grain sample cell having an opening therethrough, said grain sample cell being attached to said transfer tube, said transfer tube opening being in alignment with said grain sample cell opening to permit a flow of grain through said sample cell;
a grain moisture sensor including a sensing means;
a moisture meter connected to said sensing means and operative to provide a moisture signal having property which is related to the dielectric constant of said grain sample in said confined area.

29. The tube of claim 28, wherein said sensing means includes:
a single capacitance plate having at least a portion of said plate extending into said sample cell;
a portion of said walls of said sample cell adjacent said plate serve as a second capacitance plate.

30. The tube of claim 28, wherein said sensing means includes:
a pair of capacitance plates in spaced relation, having at least a portion of said plates extending into said sample cell.

31. The tube of claim 28, wherein said sensing means includes:
a cylindrical conductive outer electrode having a top and bottom opposed openings, said outer electrode having an axis which is positioned vertically, said outer electrode being disposed within said sample cell;
a cylindrical conductive inner electrode having opposed openings and positioned coaxially within said outer electrode with the ends of said inner electrode in vertically spaced relation to the ends of said outer electrode to define an annular active region of said sample cell;
said top opening of said outer electrode being in alignment with said transfer tube opening to permit a flow of grain into said annular active region; and
sample cell closure means positioned at a lower end of said sample cell and including power closure means interconnected wherein when said closure means is closed it permits the filling of said sample cell with grain and is opened to discharge said grain sample from said cell so that an operator of a combine may obtain batch sample moisture data of grain.

32. The tube of claim 31, wherein said power closure means comprises a rotatable disk driven by a closure motor.

33. The tube of claim 28, wherein said means for moving grain through said transfer tube comprises an auger.

34. A grain transfer tube comprising:

a means for moving grain through said transfer tube, said transfer tube having a portion removed to form an opening;

a cylindrical conductive electrode positioned coaxially within said transfer tube to define an annular active region between said transfer tube and said inner electrode;

said transfer tube region adjacent said annular active region acting as an outer electrode; and, a moisture meter connected to said inner and outer electrode and operative to provide a moisture signal having property which is related to the dielectric constant of said grain sample in said cell.

35. A grain transfer tube comprising:

a means for moving grain through said transfer tube, said transfer tube having a portion removed to form an opening;

a grain sample cell having an opening therethrough, said grain sample cell being attached to said transfer tube, said transfer tube opening being in alignment with said grain sample cell opening to permit a flow of grain through said sample cell;

a cylindrical conductive electrode having a top and bottom opposed openings, said outer electrode having an axis which is positioned vertically, said outer electrode being disposed within said sample cell;

a cylindrical conductive inner electrode having opposed openings and positioned coaxially within said outer electrode with the ends of said inner electrode in vertically spaced relation to the ends of said outer electrode to define an annular active region of said sample cell;

said top opening of said outer electrode being in alignment with said transfer tube opening to permit a flow of grain into said annular active region;

a moisture mete connected to said inner and outer electrode and operative to provide a moisture signal having property which is related to the dielectric constant of said grain sample in said cell; and sample cell closure means positioned at a lower end of said sample cell and including power closure means interconnected wherein when said closure means is closed it permits the filling of said sample cell with grain and is opened to discharge said grain sample from said cell so that an operator of a combine may obtain batch sample moisture data of grain.

36. A grain moisture sensing system for monitoring the moisture content of grain being threshed comprising:

a combine having a grain thresher, a storage hopper, and a series of connected auger tubes between said thresher and said storage hopper, said series of auger tubes having a portion of said auger tube removed forming an opening;

a grain sample cell mounted on said auger tube and adjacent said auger tube opening for collecting a sample of grain outside said auger tube, said sample cell having walls and a top and bottom opening, said top opening of said sample cell being in alignment with said auger tube opening to permit a continuous flow of grain through said sample cell;

a means for closing said sample cell positioned proximate said sample cell bottom opening;

a moisture sensor extending into said sample cell; and, a moisture meter connected to said moisture sensor and operative to provide a moisture signal having a property which is related to the dielectric constant of a grain sample in said sample cell.

* * * * *